(12) United States Patent
Harre et al.

(10) Patent No.: US 7,625,954 B2
(45) Date of Patent: Dec. 1, 2009

(54) METHOD FOR PRODUCING POLYURETHANE-SOFT FOAM MATERIALS

(75) Inventors: Kathrin Harre, Dresden (DE); Raimund Ruppel, Dresden (DE); Berend Eling, Lemfoerde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 199 days.

(21) Appl. No.: 11/575,165

(22) PCT Filed: Sep. 20, 2005

(86) PCT No.: PCT/EP2005/010121
§ 371 (c)(1),
(2), (4) Date: Mar. 13, 2007

(87) PCT Pub. No.: WO2006/034799
PCT Pub. Date: Apr. 6, 2006

(65) Prior Publication Data
US 2007/0282028 A1 Dec. 6, 2007

(30) Foreign Application Priority Data
Sep. 28, 2004 (DE) ............... 10 2004 047 406

(51) Int. Cl.
*C08G 18/28* (2006.01)
(52) U.S. Cl. .............. 521/174; 521/137; 521/163
(58) Field of Classification Search .......... 521/137, 521/163, 174
See application file for complete search history.

(56) References Cited

U.S. PATENT DOCUMENTS

| 5,648,559 A | * | 7/1997 | Hager | ............... 568/620 |
| 6,288,133 B1 | * | 9/2001 | Hagquist | ............... 521/163 |
| 2004/0147627 A1 | | 7/2004 | Hager et al. | |

FOREIGN PATENT DOCUMENTS

| EP | 1 199 323 | 4/2002 |
| EP | 1 277 775 | 1/2003 |
| EP | 1 403 301 | 3/2004 |
| WO | 91 18909 | 12/1991 |
| WO | 97 23530 | 7/1997 |
| WO | 97 27236 | 7/1997 |
| WO | 99 51657 | 10/1999 |
| WO | 01 57104 | 8/2001 |
| WO | 03 059980 | 7/2003 |

* cited by examiner

*Primary Examiner*—John Cooney
(74) *Attorney, Agent, or Firm*—Oblon, Spivak, McClelland, Maier & Neustadt, L.L.P.

(57) ABSTRACT

The invention relates to a process for producing flexible polyurethane foams, in particular molded flexible polyurethane foams, by reacting a) polyisocyanates with b) compounds having at least two hydrogen atoms which are reactive toward isocyanate groups, wherein at least one polyether alcohol bi) which has been prepared by means of a DMC catalyst and has a hydroxyl number in the range from 15 to 35 mg KOH/g, and ethylene oxide content in the range from 5 to 18% by weight, based on the total weight of the polyether alcohol and an end block of ethylene oxide and propylene oxide having an ethylene oxide content of from 25 to 75% by weight, based on the amount of alkylene oxide in the end block, is used as compound b) having at least two hydrogen atoms which are reactive toward isocyanate groups.

8 Claims, 1 Drawing Sheet

List of reference numerals for Figure 1
1 – pressure gauge
2 – flow meter
3 – foam specimen
4 – upper measuring plate
5 – support
Figure 1: Construction of the measurement apparatus for determining the air permeability
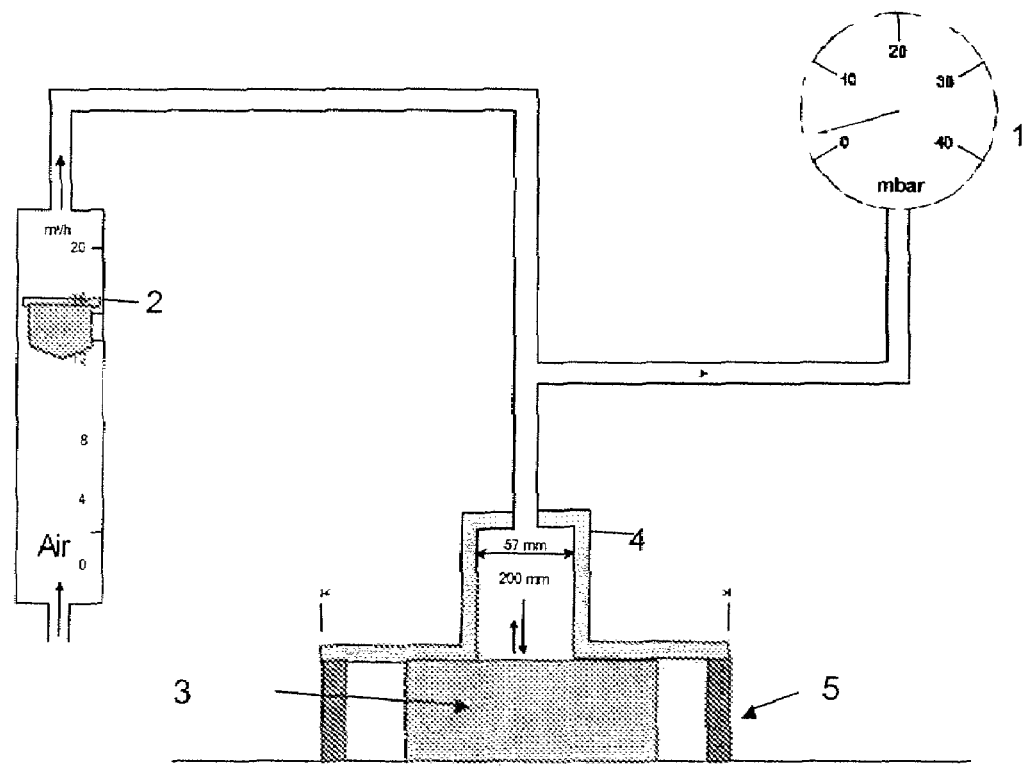

METHOD FOR PRODUCING POLYURETHANE-SOFT FOAM MATERIALS

The invention relates to a process for producing flexible polyurethane foams, in particular high-resilience molded flexible foams.

Flexible polyurethane foams and their production by reaction of polyisocyanates with compounds having at least two hydrogen atoms which are reactive toward isocyanate groups have been known for a long time.

Polyether alcohols which have an end block of ethylene oxide units, usually making up from 5 to 25% by weight of the weight of the polyether alcohol, and 70-90% primary hydroxyl groups in order to ensure sufficient reactivity of the polyol are usually used for such applications. Typical hydroxyl numbers of such polyols are in the range from 25 to 35 mg KOH/g. The polyether alcohols mentioned are usually prepared by addition of alkylene oxides onto H-functional starter substances, in particular 2- and/or 3-functional alcohols.

Recently, multimetal cyanide compounds, also known as DMC catalysts, have frequently been used as catalysts for the addition of alkylene oxides onto H-functional starter substances. The use of DMC catalysts makes it possible to obtain polyether alcohols which have a reduced content of unsaturated constituents. A further advantage of the use of DMC catalysts is the higher space-time yield compared to basic catalysts. However, they also have disadvantages. A significant disadvantage is the formation of very high molecular weight constituents in the polyol, which have a very adverse effect during foaming. A further disadvantage is that only propylene oxide and mixtures of propylene oxide and ethylene oxide can be added on uniformly. The addition reaction of pure ethylene oxide results in formation of products having a very broad molecular weight distribution. Such polyols are usually turbid, have a relatively high viscosity, result in processing difficulties in production of the foams and the resulting foams have an increased susceptibility to hydrolysis.

To overcome this deficiency, EP 1,403,301, EP 1,199,323, WO 91/18909, EP 1,277,775 and WO 03/59980, for example, propose firstly adding on propylene oxide or mixtures of ethylene oxide and propylene oxide using DMC catalysts, adding basic catalysts to the resulting intermediates and adding on ethylene oxide. Disadvantages of this process are, in particular, that an additional process step is necessary and that the basic catalyst has to be removed from the product, which costs money, while the DMC catalyst can usually remain in the product.

It was an object of the invention to develop a process for producing flexible polyurethane foams, in particular molded flexible polyurethane foams, having good air permeability and a high rebound resilience, in which process it is possible to use a polyether alcohol which can be prepared using DMC catalysts.

It has surprisingly been found that polyether alcohols prepared by means of DMC catalysts display a behavior in foam production similar to classical polyether alcohols having an end block of pure ethylene oxide units if they have a hydroxyl number in the range from 15 to 35 mg KOH/g, an ethylene oxide content in the range from 5 to 18% by weight, based on the total weight of the polyether alcohol, and an end block of ethylene oxide and propylene oxide having an ethylene oxide content of from 25 to 75% by weight, based on the amount of alkylene oxide in the end block.

The invention accordingly provides a process for producing flexible polyurethane foams, in particular molded flexible polyurethane foams, by reacting a) polyisocyanates with b) compounds having at least two hydrogen atoms which are reactive toward isocyanate groups, wherein at least one polyether alcohol b1) which has been prepared by means of a DMC catalyst and has a hydroxyl number in the range from 15 to 35 mg KOH/g, and ethylene oxide content in the range from 5 to 18% by weight, based on the total weight of the polyether alcohol and an end block of ethylene oxide and propylene oxide having an ethylene oxide content of from 25 to 75% by weight, based on the amount of alkylene oxide in the end block, is used as compound b) having at least two hydrogen atoms which are reactive toward isocyanate groups.

The polyether alcohols b1) used according to the invention preferably have a functionality in the range from 2 to 3. The proportion of primary hydroxyl groups is preferably in the range from 15 to 50 mol %. The primary hydroxyl groups result from ethylene oxide units.

The proportion of the total weight of the polyether alcohol b1) made up by the end block is, in particular, from 5 to 50% by weight, preferably in the range from 10 to 30% by weight.

In a preferred embodiment of the present invention, the end block of the polyether alcohols b1) is added on with the ratio of the two alkylene oxides being altered during the course of the addition reaction. Such a mode of operation is described in WO 01/44347. Preference is given to increasing the proportion of ethylene oxide in the mixture relative to the proportion of propylene oxide during the course of the metered addition of the end block in the preparation of the polyether alcohols used according to the invention. The proportion of ethylene oxide in the mixture is preferably varied from at least 5% by weight to not more than 95% by weight.

The preparation of the polyether alcohols b1) is carried out, as described above, by addition of alkylene oxides onto H-functional starter substances using multimetal cyanide compounds, frequently also referred to as DMC catalysts. Such compounds are known and are described, for example, in EP-A 1 053 787 or EP-A 0 755 716.

As H-functional starter substances, use is preferably made of 2- and/or three-functional alcohols. Preference is given to using alcohols having a molecular weight in the range from 62 to 400 g/mol. Glycerol, trimethylolpropane, ethylene glycol, propylene glycol, diethylene glycol, dipropylene glycol, butanediol and any mixtures of at least two of the alcohols mentioned are preferably used. In particular, glycerol and/or ethylene glycol are used.

To avoid a delay in commencement of the reaction, also referred to as induction period, reaction products of the lower alcohols with alkylene oxides are frequently used. These reaction products usually have a molecular weight in the range from 400 to 1000 g/mol. These reaction products are preferably prepared by customary base-catalyzed addition of alkylene oxides onto the alcohols mentioned. To avoid damage to the DMC catalyst, the basic catalyst has to be removed completely from the reaction product.

The preparation of the polyether alcohols b1) can be carried out by various methods.

One possibility is batchwise preparation. For this purpose, the starter substance and the catalyst are placed in a reactor, usually a stirred vessel, activated and, after the reaction commences, the alkylene oxide is metered in. The individual segments of the polyether chain are introduced in succession, with an after-reaction phase to allow complete reaction of the monomeric alkylene oxides still present in the reactor usually being provided between these metered additions.

In a particular embodiment of the batchwise process, low molecular weight alcohol is introduced in addition to the alkylene oxides for at least part of the time. The metered addition of further alcohol is preferably carried out only during the metered addition of the first segment of the polyether chain to ensure a uniform composition of the polyether alcohol. The additional metered addition of alcohol is described, for example, in EP 879 259.

In a further embodiment of the preparation of the polyether alcohols b1), all or some segments of the polyether chain are added on in a continuous process. For this purpose, the intermediate and alkylene oxides are continuously introduced into a continuous reactor, for example a stirred vessel or a tube reactor, and the end product is continuously taken off. The combination of the process mentioned with parallel introduction of low molecular weight alcohols is also possible. Processes for the continuous preparation of polyether alcohols by means of DMC catalysts are described, for example, in WO 98/03571.

The preparation of the polyether alcohols b1) is carried out under customary conditions. At the beginning of the reaction, the starter substance is placed in the reaction vessel and, if necessary, water and other volatile compounds are removed. This is usually achieved by distillation, preferably under reduced pressure. The catalyst can be present initially in the starter substance, but it is also possible to add the catalyst only after the treatment of the starter substance. In the latter variant, the catalyst is subjected to less thermal stress. Before the metered addition of the alkylene oxides, it is customary to make the reactor inert in order to avoid undesirable reactions of the alkylene oxides with oxygen. The alkylene oxides or the mixture of alkylene oxides and starter substance are then metered in, with the addition reaction being carried out in the above-described manner. The addition reaction of the alkylene oxides is usually carried out at pressures in the range from 0.01 bar and 10 bar and temperatures in the range from 50 to 200° C., preferably from 90 to 150° C. It has been found that the rate at which the alkylene oxides are metered in likewise has an influence on the reactivity of the polyether alcohols formed. The faster the alkylene oxides are metered in, the higher the reactivity of the resulting polyether alcohols.

In a preferred embodiment of the preparation of the polyether alcohols b1), the ratio of the alkylene oxides in the joint metered addition of ethylene oxide and propylene oxide is altered over the course of the metered addition. This method is described, for example, in WO 01/44347 and is also referred to as dynamic metering. The dynamic metering is preferably used for adding on the end block in the preparation of the polyether alcohols used in the process of the invention. The dynamic metering is preferably carried out with the proportion of propylene oxide in the mixture being reduced during the course of the metered addition. The mass ratio of propylene oxide to ethylene oxide in the dynamic block is preferably reduced from 1:0.05-1:2 at the commencement of the metered addition to 1:5-1:20 at the end of the metered addition. The proportion of primary hydroxyl groups in the polyether alcohol is particularly favorable in this range.

The addition of the alkylene oxides is usually followed by an after-reaction phase to ensure complete reaction of the alkylene oxides. Unreacted monomers and volatile compounds are then removed from the reaction mixture, usually by distillation. The DMC catalyst can usually remain in the polyether alcohol, but it is in principle also possible for all or part of it to be removed, for example by means of filtration. The finished polyether alcohol is usually stabilized against thermooxidative degradation, generally by addition of antioxidants such as sterically hindered amines or phenols.

The polyether alcohols b1) described can be reacted either alone or in admixture with other compounds having at least two hydrogen atoms which are reactive toward isocyanate groups to produce flexible polyurethane foams.

The flexible polyurethane foams of the invention are produced by reacting the polyether alcohols b1) with polyisocyanates. The reaction is usually carried out in the presence of blowing agents, catalysts and customary auxiliaries and/or additives.

As regards the starting materials used, the following details may be provided.

Polyisocyanates which can be used are all isocyanates having two or more isocyanate groups in the molecule. It is possible to use aliphatic isocyanates such as hexamethylene diisocyanate (HDI) or isophorone diisocyanate (IPDI) or preferably aromatic isocyanates such as tolylene diisocyanate (TDI), diphenylmethane diisocyanate (MDI) or mixtures of diphenylmethane diisocyanate and polymethylenepolyphenylene polyisocyanates (crude MDI). It is also possible to use isocyanates which have been modified by incorporation of urethane, uretdione, isocyanurate, allophanate, uretonimine and other groups, known as modified isocyanates.

Preference is given to using TDI or MDI, its higher homologues and/or their reaction products with compounds having at least two hydrogen atoms which are reactive toward isocyanate groups as polyisocyanates a).

To produce flexible slabstock foams, particular preference is given to using TDI, while MDI and its higher homologues are preferably used in the preferred production of molded foams.

As compounds having at least two groups which are reactive toward isocyanate groups, which can, if necessary, be used in admixture with the polyether alcohols b1), preference is given to using polyols. Among polyols, polyether polyols and polyester polyols have the greatest industrial importance. The polyether polyols used for producing polyurethanes are usually prepared by base-catalyzed addition of alkylene oxides, in particular ethylene oxide and/or propylene oxide, onto H-functional starter substances. Polyester polyols are usually prepared by esterification of polyfunctional carboxylic acids with polyfunctional alcohols. The polyols used preferably have a hydroxyl number in the range from 20 to 100 mg KOH/g and a functionality in the range from 2 to 4.

In a particular embodiment of the invention, the component b) can comprise at least one graft polyol. Such polyols are prepared by in-situ polymerization of ethylenically unsaturated monomers, in particular styrene and/or acrylonitrile, in carrier polyols, preferably polyether alcohols. The polymerization is usually carried out in the presence of initiators, polymerization regulators and polyols having built-in ethylenically unsaturated bonds, frequently also referred to as macromers. Such polyols have been known for a long time and are described, for example, in WO 03/78496. Graft polyols preferred for the process of the invention have a hydroxyl number in the range from 10 to 50 mg KOH/g, a functionality of from 2 to 3 and a solids content of from 35 to 50% by weight. Foams produced using graft polyols have a greater hardness and an improved open cell content.

In another embodiment of the invention, the component b) can comprise at least one amine-terminated polyether. The polyether chain of these compounds preferably comprises only propylene oxide units. Such products have been known for a long time and are produced, for example, by the Huntsman company and marketed under the trade name Jeffamine®. Preference is given to the bifunctional Jeffamine® D2000 having a molar mass of 2000 and the trifunctional Jeffamine® T5000 having a molar mass of 5000. The polyurethane foams produced using these amine-terminated polyethers have improved processing and an improved open cell content.

Furthermore, the use of other polyols such as polypropylene glycols or polyethylene glycols having molar masses of 400-4000 g/mol or ethylene oxide-propylene oxide polyether polyols having an ethylene oxide content of 50-80% and hydroxyl numbers of 28-55 mg KOH/g can also be preferred. Such polyols are used for improving processing and the mechanical properties. These polyols can be prepared using DMCs or KOH as catalyst.

Compounds having at least two groups which are reactive toward isocyanate groups also include chain extenders and/or crosslinkers which may also be used if appropriate. These are at least bifunctional amines and/or alcohols having molecular weights in the range from 60 to 400 g/mol.

As blowing agents, it is usual to use water, compounds which are gaseous at the reaction temperature of the urethane reaction and are inert toward the starting materials for the polyurethanes, known as physically acting blowing agents, and also mixtures thereof. Physically acting blowing agents used are usually hydrocarbons having from 2 to 6 carbon atoms, halogenated hydrocarbons having from 2 to 6 carbon atoms, ketones, acetals, ethers, inert gases such as carbon dioxide or noble gases.

As catalysts, preference is given to using amine compounds and/or metal compounds, in particular heavy metal salts and/or organometallic compounds. In particular, known tertiary amines and/or organic metal compounds are used as catalysts. Possible organic metal compounds are, for example, tin compounds such as tin (II) salts of organic carboxylic acids, e.g. tin (II) acetate, tin (II) octoate, tin (II) ethylhexanoate and tin (II) laurate, and the dialkyltin (IV) salts of organic carboxylic acids, e.g. dibutyltin diacetate, dibutyltin dilaurate, dibutyltin maleate and dioctyltin diacetate. Examples of organic amines customary for this purpose are: triethylamine, 1,4-diazabicyclo[2.2.2]octane, tributylamine, dimethylbenzylamine, N,N,N',N'-tetramethylethylenediamine, N,N,N',N'-tetramethylbutanediamine, N,N,N',N'-tetramethylhexane-1,6-diamine, dimethylcyclohexylamine. The catalysts described can be used individually or in the form of mixtures.

Auxiliaries and/or additives used are, for example, mold release agents, flame retardants, dyes, fillers and/or reinforcing materials.

It is customary in industry to mix all starting materials with the exception of the polyisocyanates to form a polyol component and to react this with the polyisocyanates to form the polyurethane.

The polyurethanes can be produced by the one-shot process or by the prepolymer process.

An overview of the starting materials for the production of polyurethanes and the processes employed for this purpose may be found, for example, in the Kunststoffhandbuch, Volume 7 "Polyurethane", Carl-Hanser-Verlag Munich, Vienna, 1st edition 1966, 2nd edition 1983 and 3rd edition 1993.

The flexible polyurethane foams produced by the process of the invention have a high air permeability and good mechanical properties, in particular a high rebound resilience.

The invention is illustrated by the following examples.

EXAMPLE 1

Preparation of the Polyether Alcohols

The synthesis was carried out in a cleaned and dried 10 liter stirring autoclave. The amount of starter compound required to achieve the desired hydroxyl number, calculated according to: amount=8 kg*target OHN/OHN of starter, was placed in the stirred vessel and admixed with 125 ppm of a multimetal cyanide compound prepared from zinc acetate and hexacyanocobaltic acid in the presence of a surface-active agent as described in Example 1 of EP 0 862 947. The starter compound in Examples 1 to 18 (trifunctional polyols) of Table 1 was a glycerol propoxylate having an OHN of 142 mg KOH/g, and that in Example 19 (bifunctional polyol) was a propylene glycol propoxylate having an OHN of 240 mg KOH/g, both prepared by means of KOH catalysis with subsequent removal of the basic catalyst.

The contents of the vessel were made inert by means of nitrogen and treated at 120° C. under reduced pressure for a total of 1 hour. At 120° C., the amounts of alkylene oxides indicated in the table were introduced at the rates of addition indicated. After the metered addition had been concluded, the reaction mixture was stirred until the pressure was constant and the reaction mixture was then degassed at 105° C. and 10 mbar. The resultant product was admixed with 500 ppm of Irganox 1135 as antioxidant before further use.

The properties of the resulting polyether alcohols are likewise shown in the table.

The properties were determined by the following methods:
The determination of the content of primary hydroxyl groups derived from ethylene oxide and propylene oxide was carried out by reaction of the hydroxyl groups of the polyether alcohol with trichloroacetyl isocyanate and subsequent measurement using a BRUKER DPX 250 NMR spectrometer with a 5 mm z-shielded inverse sample head. The primary hydroxyl groups from ethylene oxide, the primary hydroxyl groups from propylene oxide and the secondary hydroxyl groups have different peaks in the spectrum. The primary hydroxyl groups from ethylene oxide units are in each case reported in Table 1. The viscosity of the polyols was determined at 25° C. in accordance with DIN 53018 and 53019, and the hydroxyl numbers were determined in accordance with DIN 53240.

TABLE 1

| | Polyols according to the invention: | | | | | | | |
|---|---|---|---|---|---|---|---|---|
| | | Composition | | | Metering rate in the dyn. | | | |
| | OHN | | | | EO | block | | |
| Example No. | mg KOH/g | PO core %* | PO tip %* | tip %* | PO-PO(*) kg/h- kg/h | EO-EO() kg/h- kg/h | 1° OH % | Visc mPa · s |
| 1 | 26 | 82 | 6 | 10 | 0.5-0.1 | 0.1-0.99 | 29 | 1300 |
| 2 | 32 | 76 | 8 | 14 | 0.5-0.1 | 0.5-0.5 | 31 | 1390 |
| 3 | 26 | 72 | 10 | 16 | 0.5-0.1 | 0.5-0.5 | 36 | 1290 |

TABLE 1-continued

Polyols according to the invention:

| Example No. | OHN mg KOH/g | Composition | | | Metering rate in the dyn. block | | 1° OH %** | Visc mPa · s |
|---|---|---|---|---|---|---|---|---|
| | | PO core %* | PO tip %* | EO tip %* | PO-PO(*) kg/h- kg/h | EO-EO(**) kg/h- kg/h | | |
| 4 | 32 | 82 | 6 | 10 | 0.5-0.1 | 0.5-0.5 | 27 | 1370 |
| 5 | 24 | 76 | 6 | 16 | 0.5-0.1 | 0.1-1.73 | 31 | 1840 |
| 6 | 24 | 74 | 14 | 10 | 0.5-0.1 | 0.1-0.33 | 26 | 1450 |
| 7 | 31 | 82 | 6 | 10 | 0.5-0.1 | 0.5-0.5 | 26 | 1600 |
| 8 | 24 | 82 | 6 | 10 | 0.5-0.1 | 0.1-0.92 | 29 | 1710 |
| 9 | 22 | 82 | 6 | 10 | 0.5-0.1 | 0.1-0.92 | 31 | 1640 |
| 10 | 21 | 78 | 6 | 14 | 0.5-0.1 | 0.7-0.7 | 32 | 1870 |
| 11 | 23 | 78 | 6 | 14 | 0.5-0.1 | 0.3-1.13 | 31 | 2080 |
| 12 | 22 | 74 | 6 | 18 | 0.5-0.1 | 0.9-0.9 | 40 | 2660 |
| 13 | 22 | 74 | 6 | 18 | 0.5-0.1 | 0.3-1.54 | 40 | 3000 |
| 14 | 22 | 72 | 16 | 10 | 0.5-0.1 | 0.19-0.19 | 28 | 1870 |
| 15 | 21 | 72 | 16 | 10 | 0.5-0.1 | 0.1-0.24 | 25 | 1830 |
| 16 | 22 | 62 | 23 | 14 | 0.5-0.1 | 0.2-0.2 | 21 | 1790 |
| 17 | 20 | 68 | 20 | 12 | 0.5-0.1 | 0.2-0.2 | 22 | 2020 |
| 18 | 25 | 67 | 20 | 12 | 0.5-0.1 | 0.2-0.2 | 21 | 1410 |
| 19 | 20 | 72 | 16 | 10 | 0.5-0.1 | 0.1-0.25 | 24 | 1310 |

*based on the weight of the polyether alcohol
**primary hydroxyl groups of ethylene oxide
Core - interior block
Tip - end block
Metering rate in the dynamic block, where:
(*)indicates the metering rate of PO at the beginning and the metering rate of PO at the end, both in kg/h
(**)indicates the metering rate of EO at the beginning and the metering rate of EO at the end, both in kg/h.

Polyols of the Comparative Examples:

| Comparative Example No. | OHN mg KOH/g | Composition | | | Metering rates for dyn. block | | 1° OH %** | Visc mPas |
|---|---|---|---|---|---|---|---|---|
| | | PO core %* | PO tip %* | EO tip %* | PO-PO kg/h-kg/h | EO-EO kg/h-kg/h | | |
| I | 55 | 76 | 8 | 13 | 0.5-0.1 | 0.5-0.5 | 34 | 580 |
| II | 35 | 54 | 11 | 33 | 2.5-0.1 | 3.9 | 56 | 1720 |
| III | 34 | 54 | 11 | 33 | 0.5-0.1 | 0.9 | 54 | 1580 |
| IV | 34 | 68 | 11 | 19 | 0.5-0.1 | 0.5-0.5 | 40 | 945 |
| V | 27 | 66 | 12 | 20 | 0.5-0.1 | 0.5-0.5 | 40 | 1380 |
| VI | 22 | 68 | 11 | 19 | 0.5-0.1 | 0.5-0.5 | 36 | 1730 |

Preparation of the Isocyanates:

The following isocyanate compositions served as B component. The isocyanate compositions 1 to 5 were obtained by simple mixing of three isocyanates at 50° C. These three isocyanates were: polymeric MDI having an NCO content of 31.5% by weight (isocyanate 1), pure 4,4'-MDI (isocyanate 2) and a 50/50 by weight mixture of 2,4'-MDI and 4,4'-MDI (isocyanate 3). After mixing, the isocyanate compositions were cooled to room temperature and used as such.

| | Iso. comp. 1 | Iso. comp. 2 | Iso. comp. 3 | Iso. comp. 4 | Iso. Comp. 5 |
|---|---|---|---|---|---|
| Isocyanate 1 | 60% | 50% | 40% | 30% | 20% |
| Isocyanate 2 | 0% | 10% | 20% | 30% | 40% |
| Isocyanate 3 | 40% | 40% | 40% | 40% | 40% |

The preparation of isocyanate prepolymers P1 and P2 was carried out as follows: one of the abovementioned isocyanate mixtures was firstly heated to 80° C. in a glass flask. A glycerol-based randomly polymerized ethylene oxide-propylene oxide polyether polyol having a hydroxyl number of 42 mg KOH/g and an ethylene oxide content of 75% by weight was then added dropwise over a period of half an hour while stirring. The weight ratio of polyol to isocyanate was 15/85 in all cases. This mixture was stirred at 80° C. for 2 hours. The prepolymer was subsequently cooled and the NCO value was determined.

P3 was prepared from isocyanate 3, but a mixture of the abovementioned glycerol-based randomly polymerized ethylene oxide-propylene oxide polyether polyol having a hydroxyl number of 42 mg KOH/g and an ethylene oxide content of 75% by weight and a glycerol-based polyetherol having a hydroxyl number of 55 mg KOH/g and a randomly polymerized ethylene oxide-propylene oxide interior block (proportion of EO: 5%) and a pure ethylene oxide end block, with the total amount of ethylene oxide in the end block being 5.6% of the total mass, was added as polyol component. The mixing ratio of the polyol having a hydroxyl number of 42 mg KOH/g to the polyol having a hydroxyl number of 55 mg KOH/g was 60:40 and the weight ratio of polyol mixture to isocyanate was 12:88.

|  | Iso. comp. P1 | Iso. comp. P2 | Iso. comp. P3 |
|---|---|---|---|
| Isocyanate | Iso. comp. 1 | Iso. comp. 1 | Iso. comp. 1 |
| NCO value (%) | 26.9 | 27.1 | 28.6 |

Production of the Foams

The flexible foams were produced by mixing a polyol component (A component) with an isocyanate component (B component) at an index of 100.

The A component consisted of:

100 parts of polyol 3.2 parts of water 0.8 part of catalyst Dabco® 33 LV (Air Products)

1 part of stabilizer Tegostab® B 8616 (Goldschmidt)

The polyol formulation was weighed out according to the recipe on a laboratory balance at room temperature and was stirred for half an hour at a speed of 1000 rpm. This mixture (A component) was cooled to room temperature and could then be foamed. For foaming, the required amounts of A component and B component were weighed out into a suitable cup. Dibutyltin dilaurate (DBTDL) could optionally be added as catalyst to improve the stability of the foaming process. The amount of DBTBL is reported as a percentage based on the polyol.

The components were then stirred at 1400 rpm for about 7 seconds and the mixture having a mass of 250 g was then placed in a 2 liter bucket. The cream time, fiber time and rise time were determined. The foams were pressed and squeezed by hand for 30 minutes.

The foams were sawn to the appropriate size and shape to produce test specimens and the density (DIN EN ISO 8307), air permeability, rebound resilience (DIN EN ISO 845) and compressive strength at 40% compression (DIN EN ISO 3386) were measured. The compression set (DIN EN ISO 1856), tensile strength and elongation at break (DIN EN ISO 1798) and tear propagation resistance (DIN 53515) were also measured on some foams.

To determine the air permeability of the foam, the resistance to the flow of a stream of air was measured. FIG. 1 shows the construction of the measurement apparatus. The air is blown at 17 $m^3$/h at 20° C. onto a foam specimen having dimensions of 80×80×50 $mm^3$. The upper metal plate is supported by four (1×1×4.5 $cm^3$) supports, so that the foam is compressed by about 10% during the measurement. Depending on the open cell content of the foam, a particular proportion of the air passes through the foam. The pressure generated is measured. The pressure is a measure of the open cell content of the foam. For practical applications, the pressure should be less than 20 mbar. Both the polyol structure and the isocyanate composition have a great influence on the open cell content of the foam. For a given polyol, the isocyanate composition is selected so that the foam density is less than 46 kg/$m^3$ and the flow resistance is less than 20 mbar.

EXAMPLE 1

| Series 1 | | | | | | | | | |
|---|---|---|---|---|---|---|---|---|---|
| | | Polyol | | | | | | | |
| | | 1 | 2 | 3 | 4 | 5 | 6 | 7 | 8 |
| Iso. comp. | | 2 | 3 | 4 | 2 | 2 | 2 | 2 | 1 |
| Sn | % | 0.3 | 0.3 | 0.3 | 0.6 | 0.2 | 0 | 0.4 | 0.4 |
| Cream time | sec. | 18 | 12 | 15 | 17 | 15 | 23 | 15 | 15 |
| Fiber time | sec. | 60 | 37 | 50 | 55 | 43 | 98 | 52 | 55 |
| Rise time | sec. | 105 | 55 | 70 | 62 | 85 | 185 | 90 | 95 |
| Density | kg/$m^3$ | 39 | 32 | 43.4 | 36.1 | 34.4 | 40.9 | 37.5 | 40.8 |
| Air permeability | mbar | 15 | — | — | 8.5 | 13 | 13 | 15 | 7 |
| Rebound resilience | % | 59 | — | — | 52.2 | 58.7 | 55.2 | 57 | 62 |
| Compressive strength 40% | kPa | 3.7 | — | — | 2.9 | 3.0 | 4.7 | 3.5 | 3.2 |
| | | Polyol | | | | | | | |
| | | 9 | 10 | 11 | 12 | 13 | 14 | 15 | |
| Iso. comp. | | 1 | 1 | 2 | 1 | 2 | 2 | 1 | |
| Sn | % | 0.4 | 0.5 | 0.5 | 0.6 | 0.3 | 0 | 0 | |
| Cream time | sec. | 17 | 17 | 16 | 17 | 17 | 22 | 26 | |
| Fiber time | sec. | 60 | 49 | 60 | 47 | 42 | 95 | 105 | |
| Rise time | sec. | 103 | 75 | 75 | 65 | 75 | 180 | 180 | |
| Density | kg/$m^3$ | 41.9 | 39.1 | 36.2 | 35.9 | 39.1 | 40.6 | 43 | |
| Air permeability | mbar | 10 | 10 | 8 | 7 | 18 | 11 | 16 | |
| Rebound resilience | % | 61 | 58 | 59.6 | 56.6 | 56.8 | 55 | 55.6 | |
| Compressive strength 40% | kPa | 3.3 | 3.5 | — | — | 4.0 | 4.1 | 3.7 | |

EXAMPLE 2

Use of Prepolymers in Foam Production

| | | Series 2: | | | | |
|---|---|---|---|---|---|---|
| | | Polyol | | | | |
| | | 3 | 10 | 1 | 7 | 8 |
| Iso. comp. | | P1 | P1 | P1 | P2 | P2 |
| Sn | % | 0 | 0.6 | 0.3 | 0.3 | 0.1 |
| Start time | sec. | 20 | 18 | 18 | 18 | 21 |
| Fiber time | sec. | 80 | 48 | 58 | 60 | 63 |
| Rise time | sec. | 230 | 105 | 110 | 130 | 135 |
| Density | kg/m$^3$ | 45.3 | 38.4 | 39.3 | 38.2 | 40.5 |
| Air permeability | mbar | 18 | 13 | 13 | 17 | 13 |
| Rebound resilience | % | 60.6 | 61.5 | 55.1 | 56.1 | 50.8 |
| Compressive strength 40% | kPa | — | — | — | — | — |

EXAMPLE 3

Use of a Mixture of Diol and Triol

Here, the polyol component consisted of 50 parts by weight of the trifunctional polyol 15, 50 parts by weight of the bifunctional polyol 19, 3.2 parts by weight of water, 1.0 part by weight of Tegostab® B 8616 and 0.8 part by weight of Dabco® 33 LV. The polyol component was prefoamed with the prepolymer iso. comp. P3 at an index of 95.

The polyol formulation was weighed out according to the recipe on a laboratory balance at room temperature and was stirred for half an hour at a speed of 1000 rpm. The polyol component was cooled to room temperature and could then be foamed. For foaming, the required amounts of polyol (A) component and isocyanate (B) component were weighed out into a suitable bucket. The total amount of A and B was 1300 g.

The components were then stirred at 1500 rpm in a bucket for about 10 seconds and the mixture was then poured into a 40 cm*40 cm*40 cm box. The cream time, fiber time and rise time were determined.

After a curing phase of 1-2 hours, the foam was pressed and squeezed and sawn to the appropriate size and shape to produce test specimens.

| Cream time | s | 14 |
|---|---|---|
| Fiber time | s | 100 |
| Rise time | s | 165 |
| Air permeability | mbar | 9 |
| Rebound resilience | % | 54 |
| Foam density | kg/m$^3$ | 41.8 |
| Compressive strength 40% | kPa | 2.9 |
| Compression set | % | 3.4 |
| Tensile strength | kPa | 97 |
| Elongation at break | % | 123 |
| Tear propagation resistance | N/mm | 0.54 |

EXAMPLE 4

Flexible Foam Using TDI as Isocyanate

The flexible foams were produced by mixing a polyol component (A component) with tolylene diisocyanate (80/20, B component) at an index of 110.

The A component consisted of:

100 parts of polyol
2.25 parts of water
0.8 part of diethanolamine
0.8 part of stabilizer Tegostab B 8681 LF (Goldschmidt)
0.8 part of catalyst Lupragen N201 (BASF)
0.05 part of catalyst Lupragen N206 (BASF)
0.03 part of dibutyltin dilaurate The polyol formulation without dibutyltin laurate was weighed out according to the recipe on a laboratory balance at room temperature and was stirred for half an hour at a speed of 1000 rpm. The A component was cooled to room temperature and could then be foamed.

For foaming, 1300 g of polyol component and isocyanate component were weighed out into a suitable bucket and the appropriate amount, based on the recipe given above, of dibutyltin laurate was added.

The components were then stirred at 1500 rpm for about 10 seconds and the mixture was then poured into a 40 cm*40 cm*40 cm box. The cream time and rise time were determined.

After a curing phase of 24 hours, the foams were pressed and squeezed and sawn to the appropriate size and shape to produce test specimens.

| | | Polyol | | |
|---|---|---|---|---|
| | | 16 | 17 | 18 |
| Cream time | s | 8 | 8 | 7 |
| Rise time | s | 120 | 115 | 135 |
| Foam density | kg/m$^3$ | 38.4 | 38.4 | 37.6 |
| Air permeability | mbar | 20 | 19 | 16 |
| Rebound resilience | % | 55 | 55 | 56 |
| Compressive strength 40% | kPa | 2.8 | 2.7 | 2.6 |
| Compression set | % | 4.5 | 5.8 | 4.1 |
| Tensile strength | kPa | 85 | 92 | 84 |
| Elongation at break | % | 192 | 212 | 186 |
| Tear propagation resistance | N/mm | 0.72 | 0.78 | 0.70 |

EXAMPLE 5

Flexible Foam Using an Amine-Terminated Polyether Polyol

Jeffamine T5000 is an amine-terminated polypropylene glycol from Huntsmann.

The polyol component consisted of 90 parts by weight of polyol 15, 10 parts by weight of Jeffamine® T5000, 3.2 parts by weight of water, 1.0 part by weight of Tegostab® B 8616 and 0.8 part by weight of Dabco® 33 LV.

The polyol component was foamed with the prepolymer iso. comp. P3 at an index of 95 as described in Example 3 and the mechanical properties were measured.

| | | |
|---|---|---|
| Cream time | s | 14 |
| Fiber time | s | 75 |
| Rise time | s | 130 |
| Air permeability | mbar | 19 |
| Rebound resistance | % | 52 |
| Foam density | g/l | 40.3 |

EXAMPLE 6

Flexible Foam Using a Graft Polyol

Use was made of a polyether alcohol prepared by the method of Example 1 from 1.65 kg of starter substance onto which firstly 4.11 kg of propylene oxide and then a mixture of 1.12 kg of ethylene oxide and 1.12 kg of propylene oxide had been added, with the metering rate of ethylene oxide being increased from 0.2 kg/h to 1.0 kg/h during the course of the metered addition and the metering rate of the propylene oxide being reduced from 1.0 kg/h to 0.2 kg/h during the course of the metered addition. The polyether alcohol had a hydroxyl number of 32.3 mg KOH/g, a viscosity at 25° C. of 919 mPa·s and a content of primary hydroxyl groups of 39% (polyol 20).

A polyol component was prepared from 90 parts by weight of polyol 20, 10 parts by weight of a graft polyol having a hydroxyl number of 20 mg KOH/g and a content of solids from styrene and acrylonitrile in a weight ratio of 1:1 of 43.5% by weight (Lupranol® L 4800 from BASF AG), 1.30 parts by weight of 80% strength aqueous triethanolamine solution, 0.21 part by weight of catalyst N 201 from BASF AG, 0.03 part by weight of catalyst N 206 from BASF AG, 0.10 part by weight of catalyst Kosmos® 29 from Goldschmidt AG, 2.50 parts by weight of foam stabilizer Tegostab® B 4380 from Goldschmidt AG and 2.50 parts by weight of water. This was foamed with the prepolymer 2 at an index of 95. The mold temperature was 45° C. The resulting molding had a latex-like feel.

COMPARATIVE EXAMPLE 1

Foams were not able to be produced from the polyols I to VI according to the test method described in Example 1 by optimization of the isocyanates 1 to 5. In all cases, the foams obtained were either too unstable or too closed-celled. In the first case, foam collapse can occur in extreme cases, and otherwise a foam which was coarse-celled and had a significantly higher density than expected was obtained. In the second case, the foams displayed shrinkage in the extreme case, or they had a significantly reduced air permeability. If the measured pressure build up is greater than 20 mbar, the foam is regarded as being too closed.

The invention claimed is:

1. A process for producing molded flexible polyurethane foams, comprising reacting
   a) polyisocyanates with
   b) compounds having at least two hydrogen atoms which are reactive toward isocyanate groups,
   wherein the component b) comprises at least one polyether alcohol bi) which
      is prepared by means of a DMC catalyst only,
      a hydroxyl number in the range from 15 to 35 mg KOH/g,
      an ethylene oxide content in the range from 5 to 18% by weight, based on the total weight of the polyether alcohol, and
      an end block of ethylene oxide and propylene oxide having an ethylene oxide content of from 61.5 to 75% by weight, based on the amount of alkylene oxide in the end block,
   wherein the mass ratio of propylene oxide to ethylene oxide in the end block is reduced over the course of a metered addition in the preparation of the polyether alcohol bi) from 1:0.05-1:2 at the beginning of the metered addition to 1:5-1:20 at the end of the metered addition, and
   wherein the end block in the polyether alcohol bi) is from 5 to 50% by weight of the total weight of the polyether alcohol.

2. The process according to claim 1, wherein the polyether alcohol bi) has a content of primary hydroxyl groups of from 15 to 50 mol %.

3. The process according to claim 1, wherein, during the joint metered addition of ethylene oxide and propylene oxide in the preparation of the polyether alcohol bi), the ratio of the alkylene oxides is altered over the course of the metered addition.

4. The process according to claim 1, where the compounds b) having at least two hydrogen atoms which are reactive toward isocyanate groups comprise at least one polyol which is prepared by in-situ polymerization of ethylenically unsaturated monomers in carrier polyols.

5. The process according to claim 1, wherein the compounds b) having at least two hydrogen atoms which are reactive toward isocyanate groups comprise at least one amine-terminated polyether.

6. The process according to claim 1, wherein MDI and/or its reaction products with compounds having at least two hydrogen atoms which are reactive toward isocyanate groups are/is used as polyisocyanates a).

7. The process according to claim 1, wherein TDI is used as polyisocyanates a).

8. A flexible polyurethane foam which is produced according to the process of claim 1.

* * * * *